United States Patent
Grauer et al.

(10) Patent No.: US 10,055,649 B2
(45) Date of Patent: Aug. 21, 2018

(54) IMAGE ENHANCEMENTS FOR VEHICLE IMAGING SYSTEMS

(71) Applicant: BRIGHTWAY VISION LTD., Haifa (IL)

(72) Inventors: Yoav Grauer, Haifa (IL); Eyal Levi, Haifa (IL); Ofer David, Haifa (IL)

(73) Assignee: BRIGHTWAY VISION LTD., Haifa (IL)

(*) Notice: Subject to any disclaimer, the term of this patent is extended or adjusted under 35 U.S.C. 154(b) by 304 days.

(21) Appl. No.: 15/169,783

(22) Filed: Jun. 1, 2016

(65) Prior Publication Data
US 2016/0350601 A1 Dec. 1, 2016

(30) Foreign Application Priority Data
Jun. 1, 2015 (IL) .......................................... 239129

(51) Int. Cl.
G06K 9/00 (2006.01)
G06K 9/62 (2006.01)
(Continued)

(52) U.S. Cl.
CPC ............ *G06K 9/00791* (2013.01); *B60R 1/00* (2013.01); *G06F 17/30268* (2013.01); *G06K 9/2018* (2013.01); *G06K 9/6202* (2013.01); *G06K 9/6289* (2013.01); *G06T 11/60* (2013.01); *H04N 5/23219* (2013.01); *B60R 2300/103* (2013.01); *B60R 2300/301* (2013.01);
(Continued)

(58) Field of Classification Search
CPC ............ G06K 9/00791; G06K 9/6202; G06K 9/2018; G06K 9/6289; G06F 17/30268; B60R 1/00; H04N 5/23219; G06T 11/60
See application file for complete search history.

(56) References Cited

U.S. PATENT DOCUMENTS

2008/0239078 A1* 10/2008 Mohr .................... G06T 7/0042
348/148
2009/0112389 A1* 4/2009 Yamamoto .......... B60C 23/0401
701/31.4
(Continued)

OTHER PUBLICATIONS

Search Report of IL Application No. 239129, dated Feb. 15, 2016.

*Primary Examiner* — Neil Mikeska
(74) *Attorney, Agent, or Firm* — Pearl Cohen Zedek Latzer Baratz LLP

(57) ABSTRACT

Systems and methods are provided, having sensing unit(s) configured to capture images of a surrounding of a vehicle, and a processing unit connected to a database which is configured to store imaging data relating to the surrounding of the vehicle together with metadata relating to capturing parameters of the stored imaging data. The processing unit enhances the captured images with stored imaging data according to a correspondence of metadata with vehicle situations, for example, according to a relation between capturing parameters of different sensing units. Sensing unit(s) may be gated infrared to indicate specified reflectivity parameters of regions in the captured images. Sensing unit(s) may comprise a controller applying changing patterned filters to the pixel array to enhance visibility and other image features. Multiple sensing units with gateable infrared sensors may communicate using modulated illumination spots.

18 Claims, 13 Drawing Sheets

(51) Int. Cl.
*G06F 17/30* (2006.01)
*B60R 1/00* (2006.01)
*H04N 5/232* (2006.01)
*G06K 9/20* (2006.01)
*G06T 11/60* (2006.01)

(52) U.S. Cl.
CPC ... *B60R 2300/302* (2013.01); *B60R 2300/304* (2013.01); *B60R 2300/307* (2013.01); *B60R 2300/50* (2013.01); *B60R 2300/70* (2013.01); *B60R 2300/80* (2013.01); *B60R 2300/8053* (2013.01); *G06K 2209/27* (2013.01)

(56) References Cited

U.S. PATENT DOCUMENTS

| | | | |
|---|---|---|---|
| 2012/0224747 A1* | 9/2012 | Higuchi | G08G 1/16 382/103 |
| 2012/0320219 A1* | 12/2012 | David | G01S 7/483 348/169 |
| 2014/0168265 A1* | 6/2014 | Ahn | B60R 1/00 345/633 |
| 2014/0232872 A1 | 8/2014 | Kussel | |
| 2015/0076355 A1* | 3/2015 | Grauer | H04N 5/353 250/349 |
| 2015/0084755 A1* | 3/2015 | Chen | G08G 1/16 340/435 |
| 2015/0145995 A1 | 5/2015 | Shahraray et al. | |

* cited by examiner

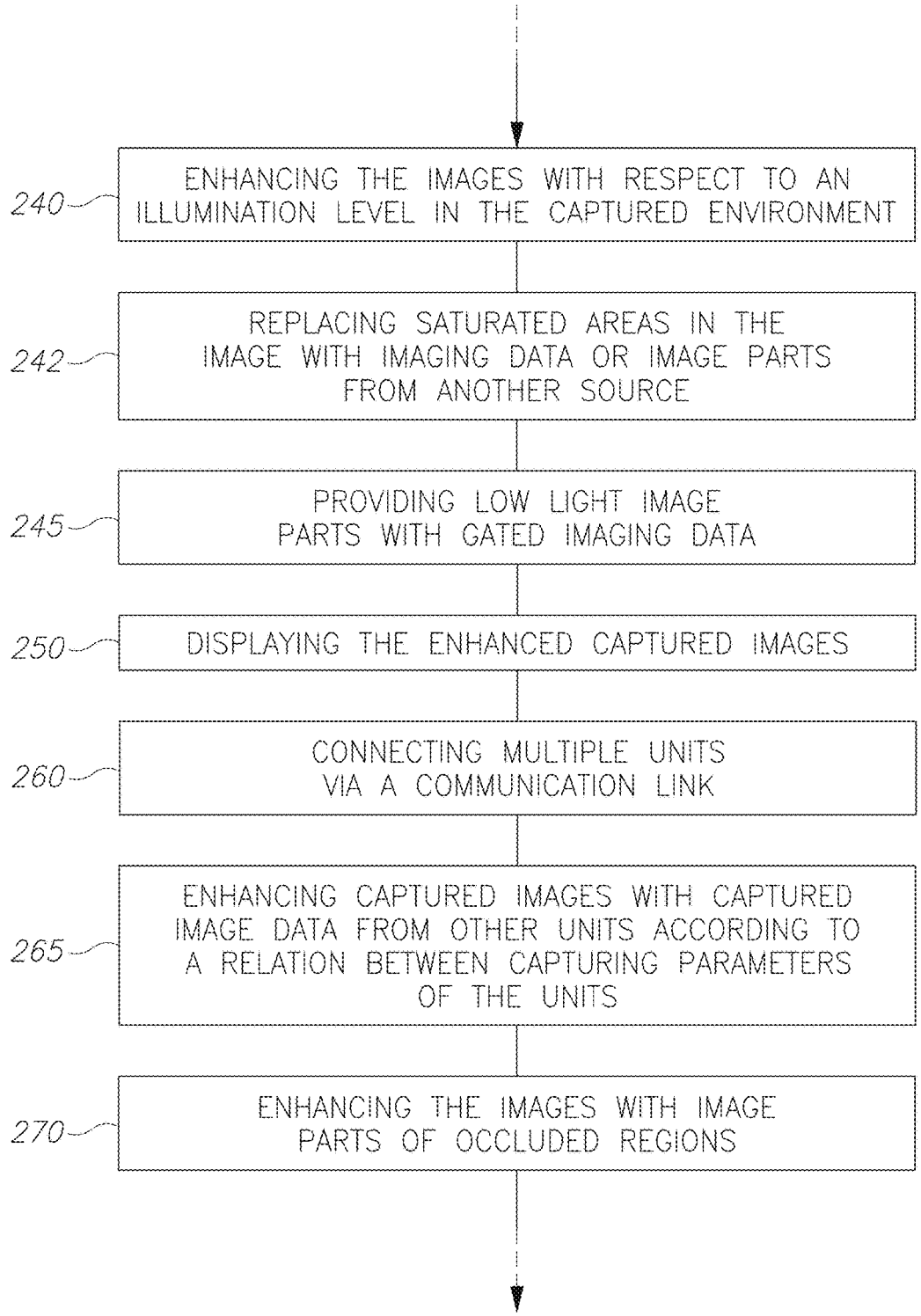
Figure 5 (cont. 1)

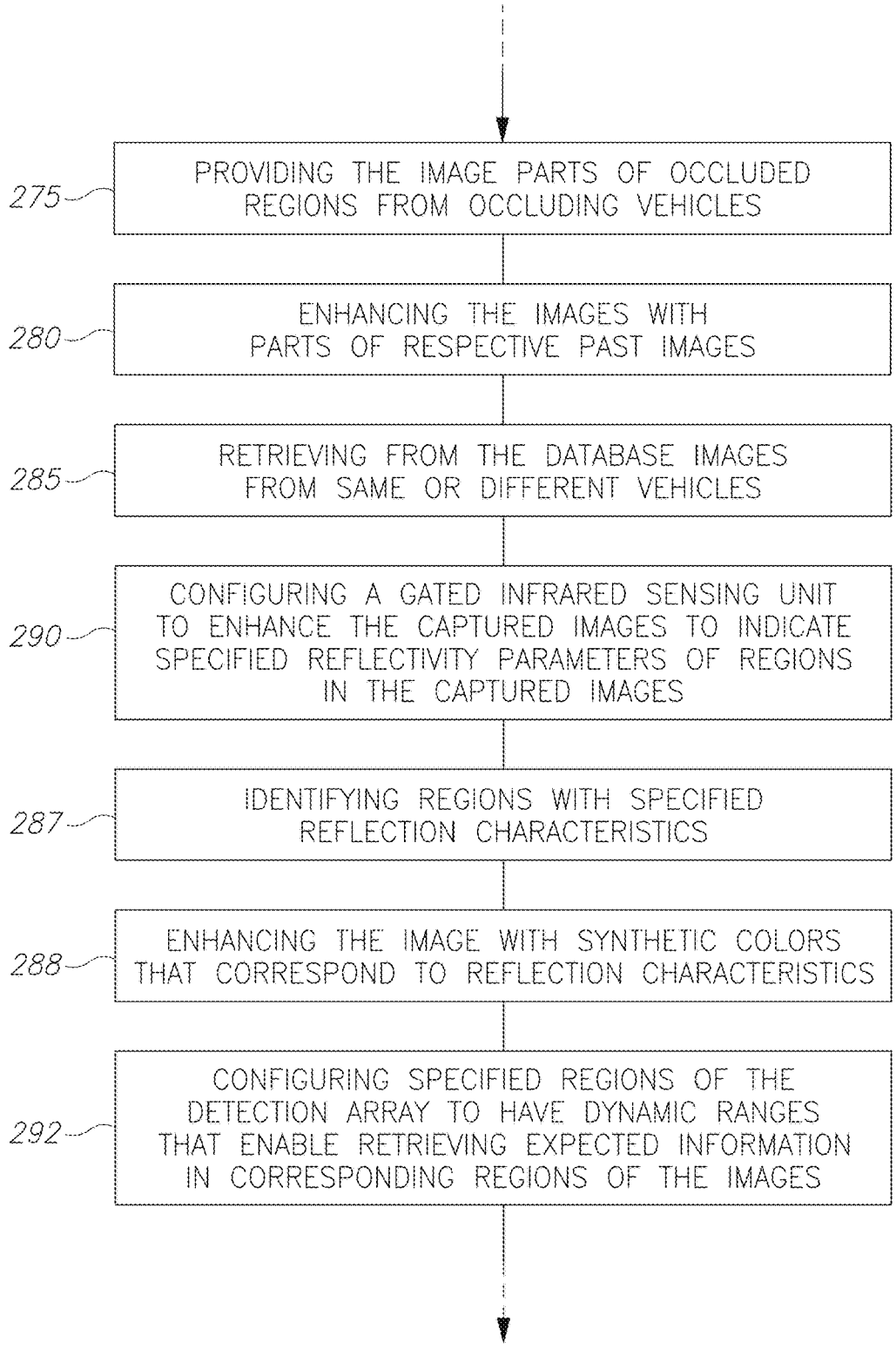
Figure 5 (cont. 2)

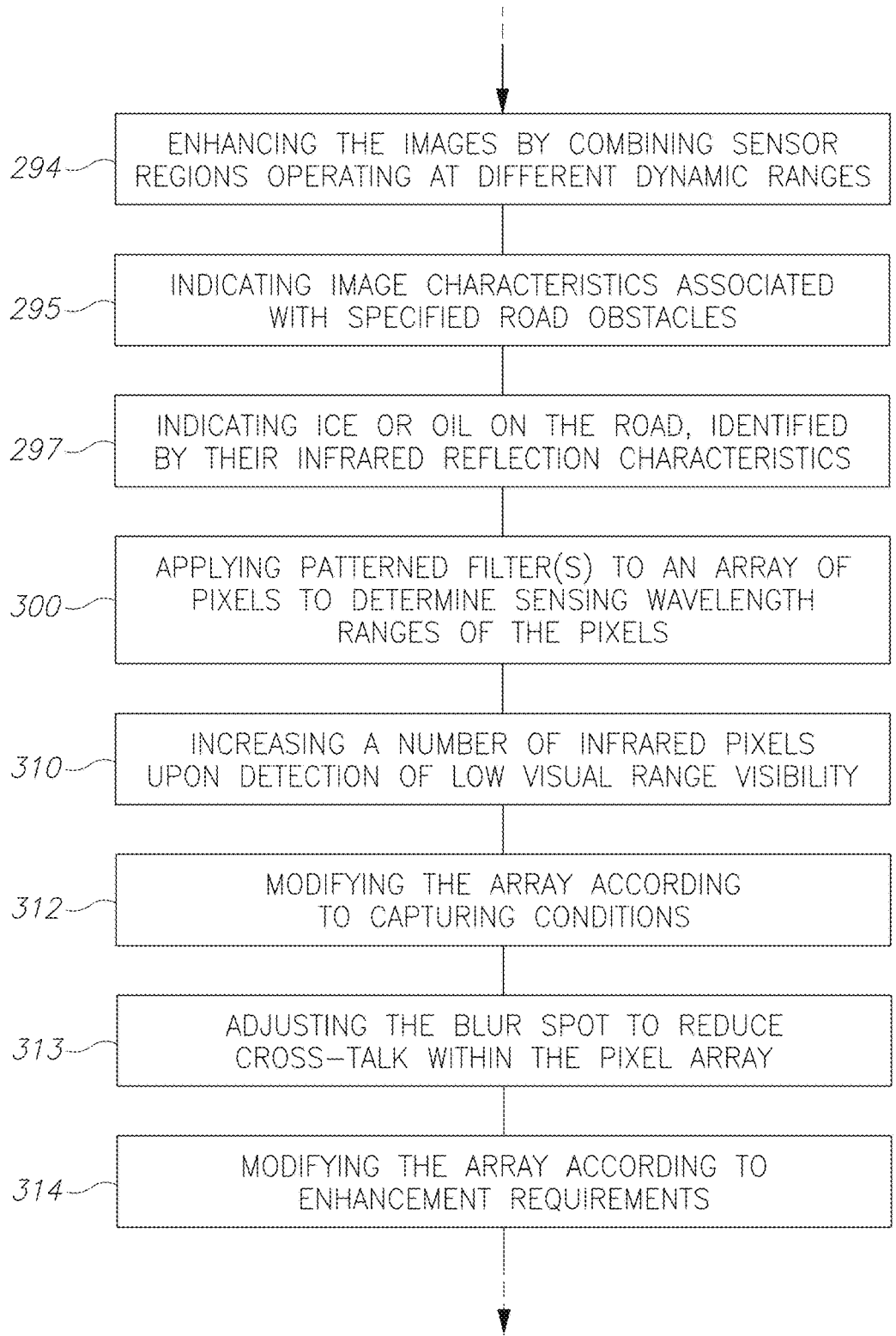
Figure 5 (cont. 3)

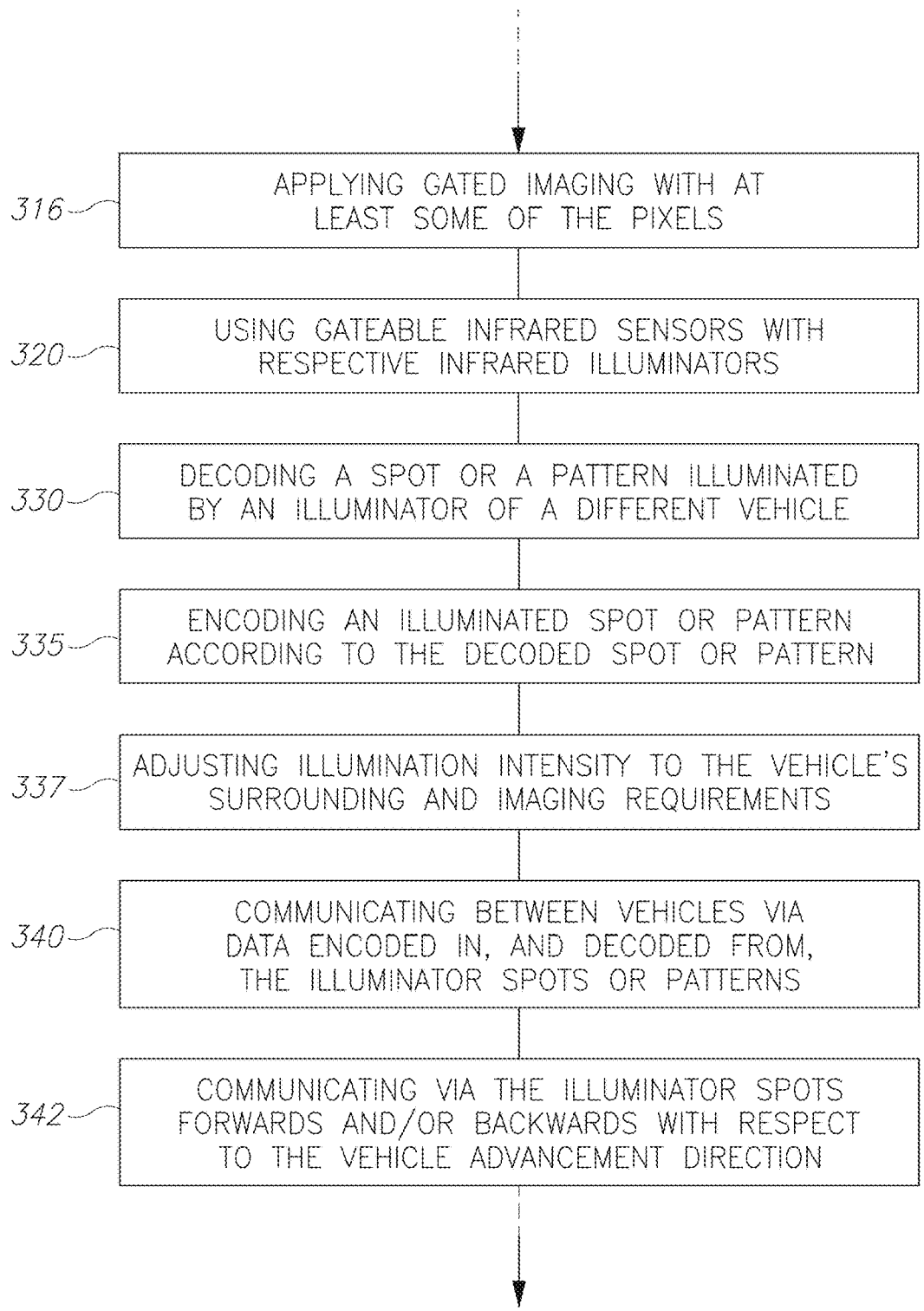
Figure 5 (cont. 4)

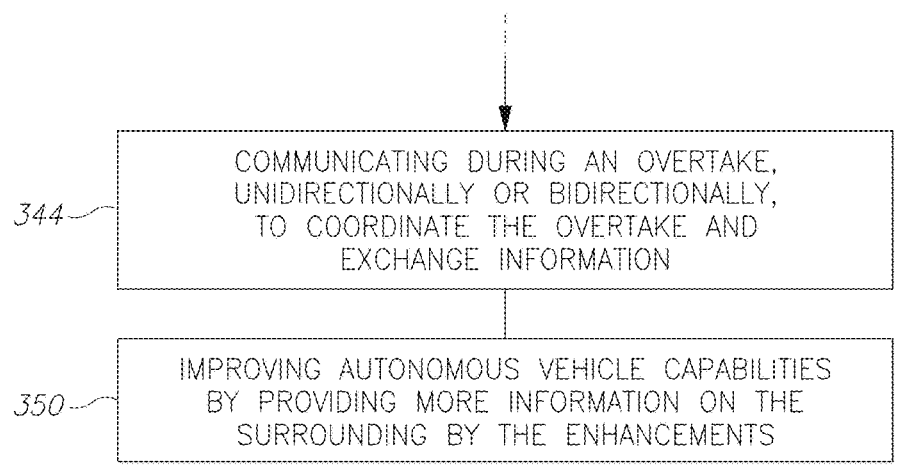
Figure 5 (cont. 5)

IMAGE ENHANCEMENTS FOR VEHICLE IMAGING SYSTEMS

CROSS REFERENCE TO RELATED APPLICATIONS

This application claims the benefit of Israeli Patent Application No. 239129, filed on Jun. 1, 2015, which is incorporated herein by reference in its entirety.

BACKGROUND OF THE INVENTION

1. Technical Field

The present invention relates to the field of vehicle imaging systems, and more particularly, to image enhancements.

2. Discussion of Related Art

Augmented reality enhances images of the environment with additional information layers which are related to the captured images.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a system comprising a sensing unit configured to capture images of a surrounding of a vehicle, and a processing unit connected to a database. The database is configured to store imaging data relating to the surrounding of the vehicle together with metadata relating to capturing parameters of the stored imaging data, and the processing unit is configured to enhance the captured images with stored imaging data from the database which are selected according to a correspondence of the metadata with a current situation of the vehicle and according to a relation between the metadata and the current situation of the vehicle.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
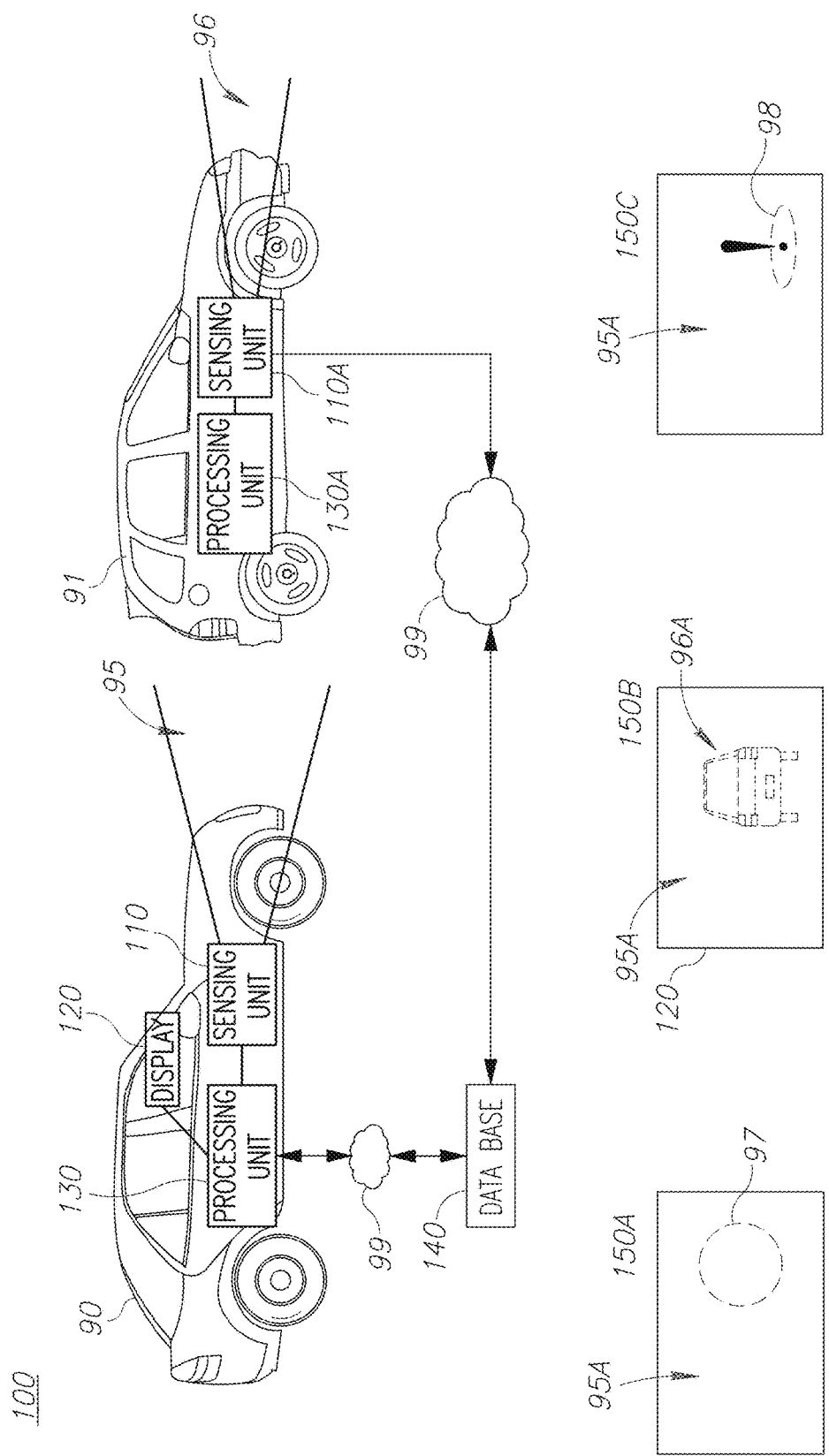
FIGS. 1A, 1B are high level schematic block diagrams of a system, according to some embodiments of the invention.

Prior to the detailed description being set forth, it may be helpful to set forth definitions of certain terms that will be used hereinafter.

The term "vehicle" as used in this application refers to any type of moving platform such as a car, a bus, bicycle, an autonomous or remotely controlled vehicle and so forth.

The terms "image" and "captured image" as used in this application interchangeably to refer to any type of optical information collected by respective sensors, comprising e.g., visual or infrared images and image parts, gated images or image parts, two or three dimensional images, video streams and so forth. The term "imaging data" as used in this application refers to any type of information related to the captured image such as locations, conditions and parameters.

The terms "illumination spot" and "illumination pattern" as used in this application interchangeably to refer to radiation projected onto a scene and reflected therefrom. The spot may have any form and the scene may include objects at different ranges from the illuminator. The radiation may be temporally and/or spatially patterned in various ways. The radiation may be in the visible spectrum, infrared spectrum or in a combination of visible and infrared spectra.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Systems and methods are provided, having sensing unit(s) configured to capture images of a surrounding of a vehicle, and a processing unit connected to a database which is configured to store imaging data relating to the surrounding of the vehicle together with metadata relating to capturing parameters of the stored imaging data. The processing unit enhances the captured images with stored imaging data according to a correspondence of metadata with vehicle situations, for example, according to a relation between capturing parameters of different sensing units. Metadata may also include data relating to any of LOS (line of sight), FOV (field of view), position, vehicle speed, velocity vector, orientation, time tag etc., and be configured to allow the combination of different input sources to yield a complete image of the scene and/or to enhance detection of objects in the scene. Sensing unit(s) may be based on imaging means (reflected or emissive). Sensing unit(s) may be contemporary image sensors which are typically semiconductor based, such as charge coupled devices (CCD), or active pixel sensors (APS) produced using the complementary metal-oxide-semiconductor (CMOS) or the N-type metal-oxide-semiconductor (N MOS) processes. Examples of such image sensors include: Intensified-CCD (ICCD)/Intensified-CMOS (ICMOS); Electron Multiplying CCD (EMCCD); Electron Bombarded CMOS (EBCMOS); Hybrid FPA (Focal Plane Array, e.g., CCD or CMOS, such as InGaAs, HgCdTe); and Avalanche Photo-Diode (APD) focal plane array. In a CMOS sensor, each array pixel is associated with respective electronic components and circuitry for converting the incident light into a corresponding electrical charge, including a photodetector, an active amplifier, a capacitor, and switching components to readout the photodetector integrated charge. Each pixel group in the sensor array may be independently controlled to collect the incident radiation and integrate the charge for a selected exposure, where the pixel data undergoes readout after an entire frame has been captured. Sensing unit(s) may also be based on a gated imaging capability, such that it is synchronized to be "on" (i.e., receive light) during the period when the reflected pulses from a specific distance are due to arrive at the sensing unit, and "off" (i.e., not receive light) during other times, thereby providing for imaging at a particular depth of field relative to the location of the sensing system. Sensing unit(s) may be a CMOS-based active-pixel sensor array, with each pixel including its own photodetector and associated components. Alternatively, sensing unit(s) may comprise hybrid sensors (e.g., an indium gallium arsenide (InGaAs) based photodetector, a mercury cadmium telluride (MCT) based photodetector, and the like), with or without gain. More generally, sensing unit(s) may be any type of device capable of acquiring and storing an image representation of a real-world scene, including the acquisition of any form of electromagnetic radiation at any range of wavelengths (e.g., light in the visible or non-visible spectrum, ultraviolet, infrared, radar, microwave, RF, and the like). Sensing unit(s) may be based on a thermal sensor such as a forward looking infrared (FLIR) camera. The thermal sensor may operate in the short wave infrared (SWIR) spectrum (e.g., between approximately 1.5-2.2 µm); medium wave infrared (MWIR) spectrum (e.g., between approximately 3-5 µm); or far infrared (FIR) spectrum (e.g., between approximately 8-14 µm). The thermal sensor may be, for example, composed of: indium gallium arsenide (InGaAs), indium antimonide (InSb), vanadium oxide (VOx), galium arsenide (GaAs), a quantum well infrared photodetector (QWIP), and/or materials such as zinc sulfide (ZnS). Sensing unit(s) may comprise one or more filters which may be patterned to filter incoming radiation per pixel and/or per pixel groups. Sensing unit(s) may comprise a controller applying changing patterned filters to the pixel array to enhance visibility and other image features. Multiple sensing units with active gateable infrared sensors may communicate using modulated and or pulsed illumination.

Figure 1B:
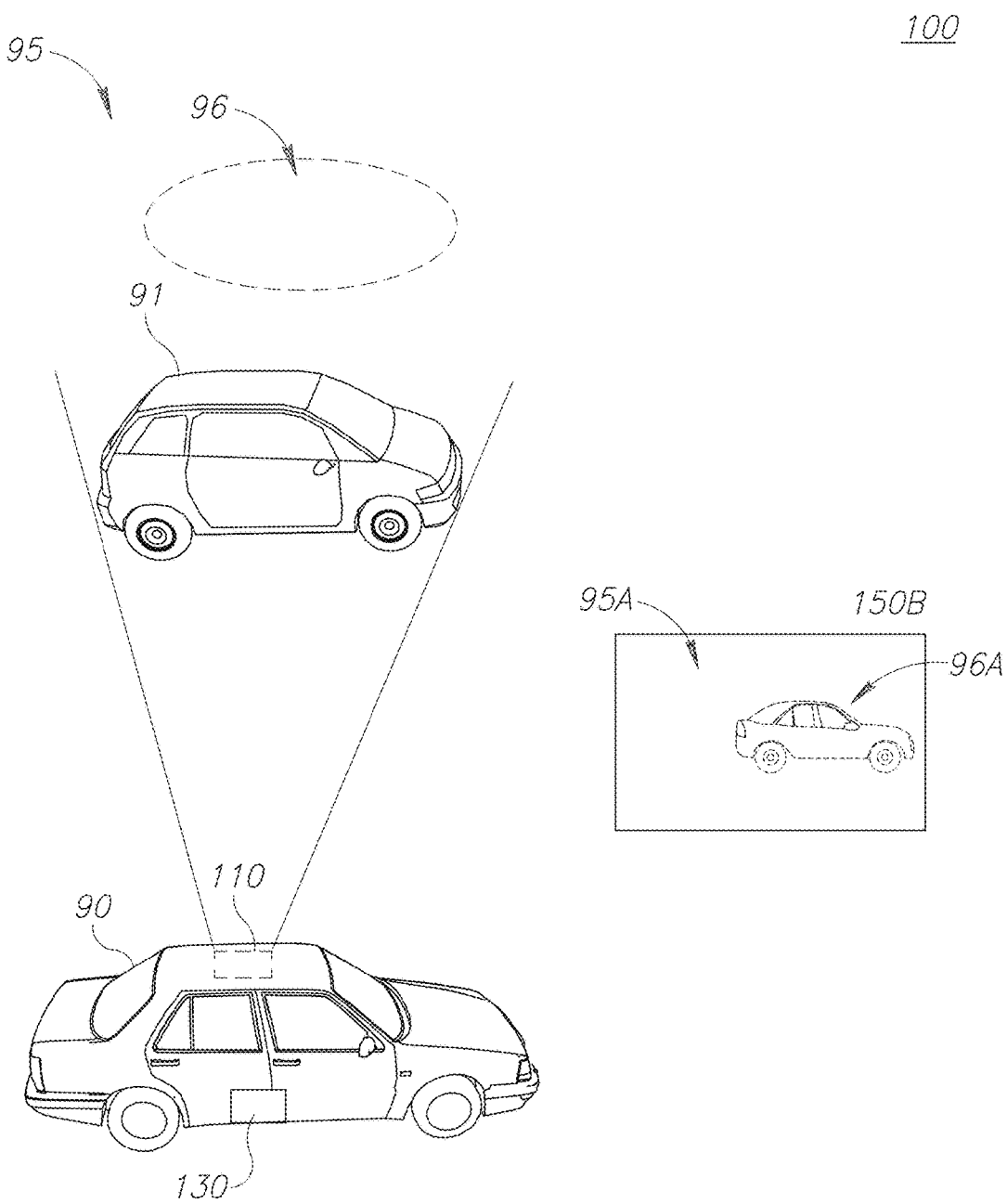

FIGS. 1A, 1B are high level schematic block diagrams of a system 100, according to some embodiments of the invention. System 100 may comprise a sensing unit 110 configured to capture images 95A of a surrounding 95 of a vehicle 90 and a processing unit 130 connected to a database 140 (e.g., via a communication link 99). Database 140 may be configured to store imaging data relating to surrounding 95 of vehicle 90 together with metadata relating to capturing parameters of the stored imaging data. Database 140 may be continuously updated with accumulating captured images and imaging data. Processing unit 130 may be configured to enhance captured images 95A with stored imaging data from database 140 which are selected according to a correspondence of the metadata with a current situation of vehicle 90 and according to a relation between the metadata and the current situation of vehicle 90.

The stored imaging data may comprise any kind of data, including one or more captured images or image parts, video streams, three dimensional image data or images, metadata relating to captured images and related information in any format. The stored imaging data may be used as real-information-based image augmentation to enhance captured images with image data from any source, e.g., sources differing in location, in capturing time, in weather conditions, in ambient light condition or in capturing wavelength range from sensing unit 110 during the capturing of the images. The stored imaging data may comprise recorded imaging data or realtime imaging data taken at a different location, from a different angle, by a different system or at differing imaging parameters such as wavelength range, resolution, image type (e.g., reflected or emitted) or method of sensor operation (e.g., stored imaging data may comprise gated imaging data). Accordingly, captured images and image data may be correlated with corresponding maps to enhance the captured images. The stored imaging data may be derived with respect to enhancement requirements with respect to specific images and capturing conditions. Capturing metadata may be used to dynamically coordinate between the stored imaging data used for the enhancements and the captured images to correctly enhance the images. The stored imaging data may be used to complete missing, irrelevant or occluding image parts such as blind spots (i.e., due to retro-reflectors, oncoming high beams, sun radiation etc.), object occlusions, regions with low visibility, regions out of the line of sight (LOS) and so forth (for a non-limiting example, see FIGS. 3A-3C below). Completion of missing data may be carried out automatically or manually (e.g., by the user selecting a location on a touch screen or the windshield itself).

System 100 may further comprise a display 120 configured to display (enhanced) captured images 95A. Processing unit 130 may be further configured to display enhanced images 95A on display 120. FIGS. 1A, 1B further present a few schematic illustrations of enhancements 150A-150C of image 95A which are explained below.

In certain embodiments, the enhancement (illustrated as 150A) may be carried out, e.g., at certain regions 97 of image 95A, using one or more images or image parts captured by system 100 during an earlier drive in the same location, using a database image provided to processing unit 130 over communication network 99 and selected to represent occluded regions in captured image 95A and/or the enhancement (illustrated as 150A) may be carried out with respect to an illumination level in a captured environment, with image parts 97 below the illumination level provided by the gated sensor and image parts above the illumination level provided by the non-gated sensor.

System 100 may comprise several (at least two) sensing units 110, 110A configured to capture images 95A, 96A of surroundings 95, 96 of respective several (at least two) vehicles 90, 91. Sensing units 110, 110A may be interconnected, e.g., via communication link 99. In certain embodiments, system 100 may comprise sensing unit 110 and processing unit 130 in one vehicle, and multiple systems 100 in corresponding vehicles may be interconnected. All vehicles 90, 91 may comprise respective processing units 130, 130A. Processing unit 130 may be further configured to enhance captured images 95A of any of the sensing units (e.g., unit 110) with captured image data from other sensing units (e.g., unit 110A) according to a relation between capturing parameters of sensing units 110, 110A. For example, the enhancement (illustrated as 150B) may be carried out using images or image parts 96A captured by an occluding vehicle 91 with respect to a region occluded thereby. FIG. 1A schematically illustrates occluding vehicle 91 in front of vehicle 90, while FIG. 1B schematically illustrates occluding vehicle 91 at the side of vehicle 90. Some embodiments comprise any geometric configuration of occluding vehicles as well as of other occluding objects. Enhancing image or image part 96A may be determined according to the dynamic geometry of the scene, and may be provided to processing unit 130 over communication network 99. In certain embodiments, the enhancement may be carried out using a past image taken by a corresponding system or sensing unit 110A in a different vehicle during a drive in the same location and with respect to the dynamic geometry of the scene.

In certain embodiments, a user may define an area occluded by an object, e.g., using any type of inputting method such as indicating the area on the windshield or using a GUI (graphical user interface) as part of display 120. Identification of occluding objects may be carried out automatically by comparing images of the same scene which are taken by different sources and/or at different times, and analyzing the differences between them from an alterations map. In certain embodiments, the identification of occluding objects may be carried out according to object distance (e.g., estimated by gated imaging) with respect to reference data or image(s) or by comparison of multiple sequential images of the scene and detection of occluding objects entering the scene. In certain embodiments, occluding objects may comprise any interference to the image such as reflections or pixel saturation at certain regions of the image sensor. Such interferences may be detected and replaced or enhanced by image data from a different source. In certain embodiments, occluding vehicles may be identified using communication from systems 100 in the respective vehicles.

In certain embodiments, processing unit 130 may be configured to analyze a scene and/or a region approached by the vehicle to identify potential obstacles, occluding objects and/or road features (e.g., a curve ahead). For example, processing unit 130 may obtain for this purpose a three dimensional model of the road and surroundings and/or of the road and surroundings ahead of the vehicle. Processing unit 130 may be configured to obtain data relating to the potential obstacles, occluding objects and/or road features timely from a source other than the currently driving vehicle, e.g., from other sensors, from other vehicles and/or from prior drives of the same vehicle (e.g., from database 140).

In certain embodiments, processing unit 130 may be configured to analyze one or more expected traveling way and obtain ahead of the actual driving any images and image data relating to the expected traveling way(s). Processing unit 130 may be further configured to defined required information and direct sensing unit 110 accordingly during the drive.

It is noted that images and data retrieved via database 140 may be adapted by processing unit 130 according to a relation between current driving conditions (e.g., vehicle parameters, travel parameters, illumination and weather parameters etc.) and the driving conditions during the collection of the image data and capturing the images. For example, the speeds of different integrated video streams may be equalized according to the relation between the speeds of the capturing vehicles, the angles of view may be adapted to differences in the geometries of the vehicles, and of the sensors associated with the vehicles. Data fusion may thus take into account any of a multitude of parameters associated with each information source to generate coherent combined images and/or image streams. Examples for such parameters comprise travel parameters such as vehicle speed and direction, vehicle parameters such as vehicle geometry etc. Processing unit 130 may be further configured to identify missing information in the fused images and complete the missing information by additional database information, by guiding sensing unit 110 and/or by querying any available external information source.

System 100 may comprise a gated infrared sensing unit 110 configured to enhance images captured thereby to indicate specified reflectivity parameters of regions 98 in the captured images 95A. For example, the enhancement (illustrated as 150C) may be carried out with respect to image characteristics associated with specified road obstacles such as bumps or holes in the road, and/or ice or oil on the road identified by their infrared reflection characteristics (e.g., appearing as a black spot using active illumination). The obstacles may be detected in real time by the same vehicle, by other systems and/or may be detected from past recordings and represented to the user based on their location. Past detections and/or detections from other sources may be combined with real time detection to enhance the detection level and confidence.

The enhancement may comprise indications related to region(s) 98, such as the illustrated exclamation mark. The enhancement may comprise inserting stored imaging data such as image parts captured at a different location, a different occasion or using different capturing parameters (e.g., different wavelength range, active sensing etc.) in place or in addition to regions 98. System 100 may alert the driver in case of detecting the specified reflectivity parameters and/or provide the vehicle with safe maneuvering information. In certain embodiments comprising autonomous vehicles or remotely controlled vehicles, any of the image enhancements may be expressed as processed control data provided to the various vehicle controlling systems (e.g., motion control, suspension control, information control). As a non-limiting example, information provided from any of the suggested sources that may be used to enhance captured images by the sensing units, e.g., information regarding changes in the road ahead like obstacles or changing road conditions, may be used to enhance vehicle movement path and parameters, enhance control of the vehicle's suspension and enhance the information delivered to a controller or related remote users of the vehicle.

Figures 2A, 2B, 2C:
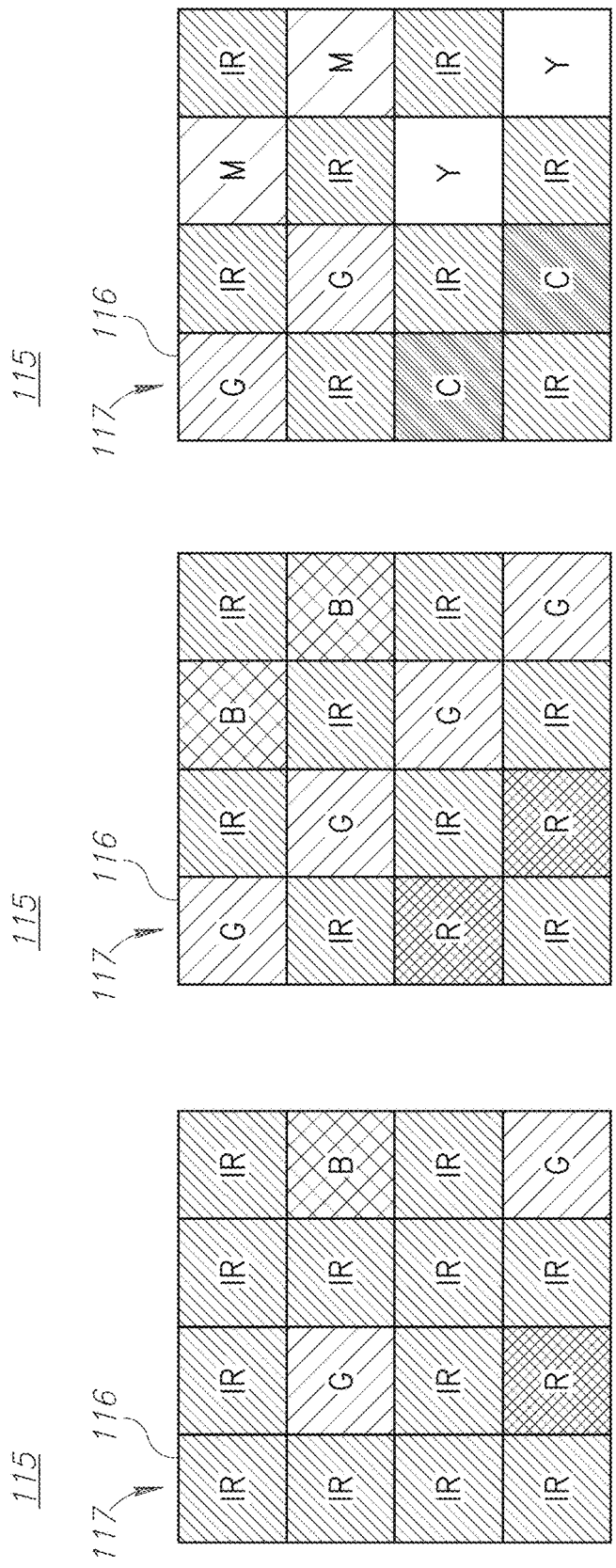
FIGS. 2A-2C are high level schematic illustrations of patterned filters, according to some embodiments of the invention.

FIGS. 2A-2C are high level schematic illustrations of patterned filters 115, according to some embodiments of the invention. In certain embodiments, sensing unit 110 may comprise an array of pixels 117 repeated on the pixelated array and a controller (not shown) arranged to apply at least one patterned filter 115 to array of pixels 117 to determine sensing wavelength ranges of each pixel. The pattern of filter 115 is represented schematically as areas 116 with respective indicated color ranges (e.g., R, G, B for red, green and blue, respectively, C, M, Y, G for cyan, magenta, yellow and green, respectively, IR for infrared spectrums). Areas 116 may correspond to single pixels or to groups of pixels. The controller may be arranged to increase a number of infrared pixels upon detection low visual range visibility, may be configured to modify the filter pattern according to capturing conditions and/or may be configured to modify the filter pattern according to enhancement requirements by associated processing unit 130.

It is noted that the optical channel in front of the array is not illustrated. The optical channel (comprising e.g., lenses, mirrors, fiber-optics etc.) is configured to optimize the optical parameters (such as MTF, distortion, transmissions etc.) for the whole pixel array spectrum in the FOV of the sensing unit.

It is further noted that in any of the embodiments, sensing unit 110 may be configured to have a controllable f-number (the f-number of an optical system is the ratio of its focal length to the diameter of its entrance pupil), which may be controlled in system 100 by any of a mechanical shutter, an electro-mechanical shutter and/or an optical shutter. In certain embodiments, the f-number may be controlled via an optical shutter comprising a ring, e.g., coated on at least one of the optical elements, made of a material having a refractive index that depends on the intensity of entering light in a way that makes it opaque at high light intensity (e.g., during daytime) to effectively reduce the pupil diameter (and respective large f-number) and transparent at low light intensity (e.g., during low light conditions) to maintain a relatively large pupil (and respective small f-number). In certain embodiments, the f-number may be controlled by any form of optical shutter covering a part of at least one optical element and made of said material. In certain embodiments, an optical shutter may be used to attenuate strong illumination or reflections during daytime or night time (e.g., approaching main beams, opposite illuminating system 100 etc.).

In certain embodiments, sensing unit 110 may comprise an array of sensors 117, including at least one gateable infrared sensor and at least on visual range sensor, and patterned filter 115 may be applied to array of sensors 117 in a manner similar to that described above.

Figure 3A:
FIGS. 3A-3D are high level schematic illustrations of exemplary image enhancements, according to some embodiments of the invention.
Figure 3B:
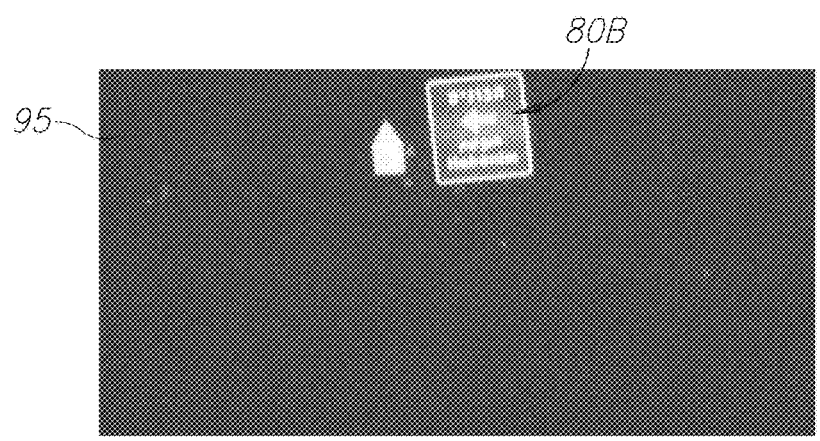
Figure 3C:

FIGS. 3A-3C are high level schematic illustrations of an exemplary image enhancement, according to some embodiments of the invention. FIG. 3A illustrates an image 95 captured by a prior art sensing unit and including a region 80A exhibiting a level of reflection which saturates the respective pixels (in the illustrated case due to retro reflection by the traffic sign). FIG. 3B illustrates an image 95 captured with different parameters (e.g., shorter exposure time, different spectral distribution, using gating, etc.) in which corresponding region 80B is not saturated. FIG. 3C illustrates enhanced image 95A which combines the surrounding of region 80A with an image part 97 cropped from region 80B (image part 97 may be part of region 80B, be the whole region, possibly with some of its periphery, and possibly be further processed to fit into the image) replacing region 80A as enhancement 150—yielding a composite image with both the general scene and the properly illuminated traffic sign. Certain embodiments may comprise image enhancements that combine image parts from different sensors, or that were captured with different sensor configurations and settings, into a single enhanced image or image stream.

Figure 3D:
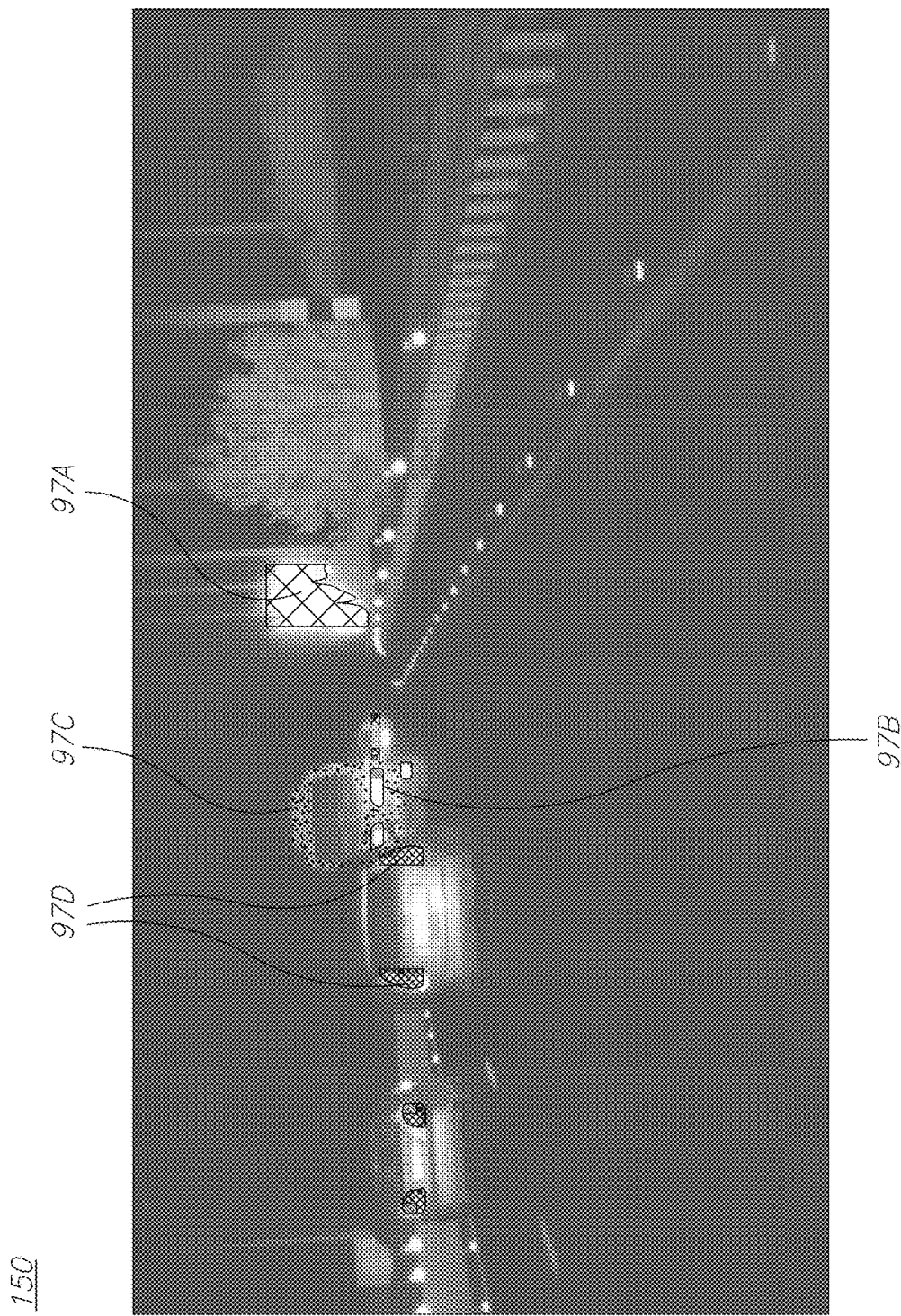

FIG. 3D is a high level schematic illustration of an exemplary image enhancement 150, according to some embodiments of the invention. Image enhancement 150 is carried out on the basis of specified reflection characteristics of certain regions in the image. For example, retro-reflectors (e.g., traffic signs 97A, indications along the road, stickers on vehicles 97B, etc.) may be identified in the image and denoted by different means such as synthetic colors or replacement regions. Diffusive reflection may also be identified and used to indicate e.g., vehicle color 97C, poles, persons etc. Some of these elements may be indicated by synthetic colors which are context dependent, e.g., taxis may be indicated by synthetic colors that correspond to the common color of taxis in the respective country. Specular reflection may also be identified and indicated, e.g., specular reflections off wet asphalt. Ambient light sources (e.g., vehicle tail lights 97D) may be used to infer additional information on the scene, which may likewise be indicated (e.g., identify weather conditions). Any of these regions may be registered with respect to the scene and respectively modified or enhances.

In certain embodiments, processing unit 130 and/or sensing unit 110 may be arranged to configure specified regions of the detection array to have dynamic ranges that enable retrieving expected information in corresponding regions of the images and to enhance the images by combining sensor regions operating at different dynamic ranges. For example, certain regions of the scene may be captured with a low dynamic range that enables detections of locally faint details, such as lane marks at the dark, while other regions of the scene may be captured with a larger dynamic range (e.g., vehicles ahead). Processing unit 130 may be configured to estimate the required dynamic ranges from different parts of the scene and adapt sensing unit 110 accordingly to optimize the dynamic ranges of parts of the sensor array according to expected required dynamic ranges.

Figure 4A:
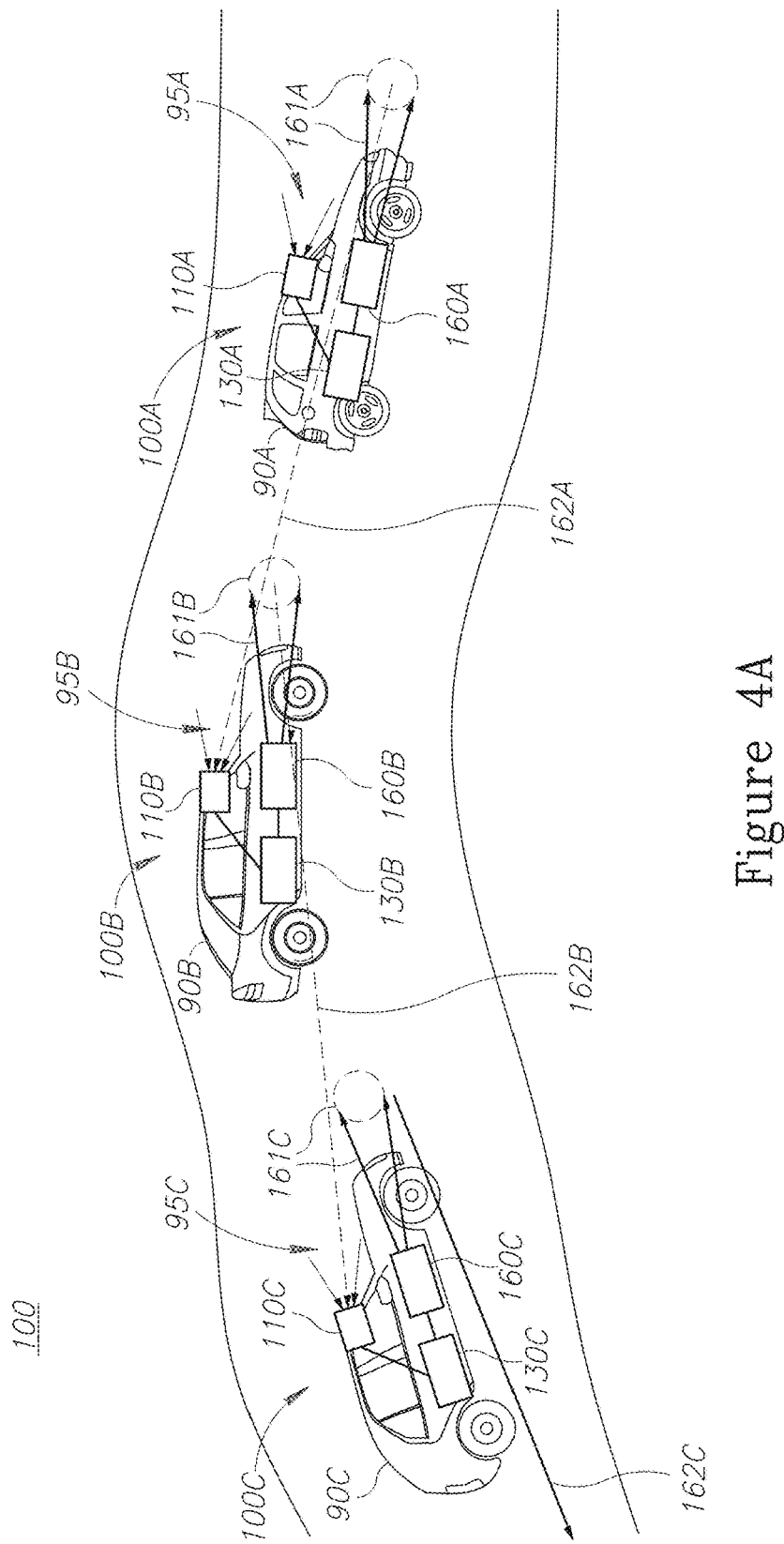
FIG. 4A is a high level schematic block diagram of a system with communication between multiple vehicle-installed systems, according to some embodiments of the invention.

FIG. 4A is a high level schematic block diagram of system 100 with communication between multiple vehicle-installed systems 100A-100C, according to some embodiments of the invention. System 100 may comprise a plurality of sensing units 110 (110A-110C), each associated with a vehicle, (90A-90C), each comprising an infrared sensor which is gateable with a respective infrared illuminator (160A-160C), and each further comprising a processing unit (130A-130C) configured to decode a spot or a pattern that is illuminated by the illuminator of a corresponding sensing unit in a different vehicle and to encode a spot illuminated by the respective illuminator according to the decoded spot. It is emphasized that the terms "illumination spot" and "illumination pattern" as used in this application interchangeably to refer to radiation projected onto a scene and reflected therefrom. The spot may have any form and the scene may include objects at different ranges from the illuminator. The radiation may be temporally and/or spatially patterned in various ways. For example, in FIG. 4, spot 161A is illuminated by illuminator 160A onto surroundings 95A, and sensed (162A) is illuminated by sensing unit 110B. Spot 161B is illuminated by illuminator 160B onto surroundings 95B, and sensed (162B) is illuminated by sensing unit 110C. Spot 161C is illuminated by illuminator 160C onto surroundings 95C, and may be sensed (162C) by other sensing units (not shown). Each processing unit 130B, 130C may be arranged to decode spot 161A, 161B, (respectively) illuminated by illuminator 160A, 160B and be further arranged to encode spot 161B, 161C illuminated by illuminator 160B, 160C of corresponding system 100B, 100C in vehicle 90B, 90C (respectively), e.g., according to decoded spot 161A, 161B. In such a way, information may be communicated through the illuminated spots between vehicle-installed systems 100A-100C in vehicles 90A-90C. For example, communicated information may comprise traffic information, image parts of hazardous road regions or any other information.

Certain embodiments may comprise establishing communication via illuminators (e.g., 160A, 160B) in a backward direction with respect to the advancement direction of the vehicles or in a forward direction with respect thereto.

Figure 4B:
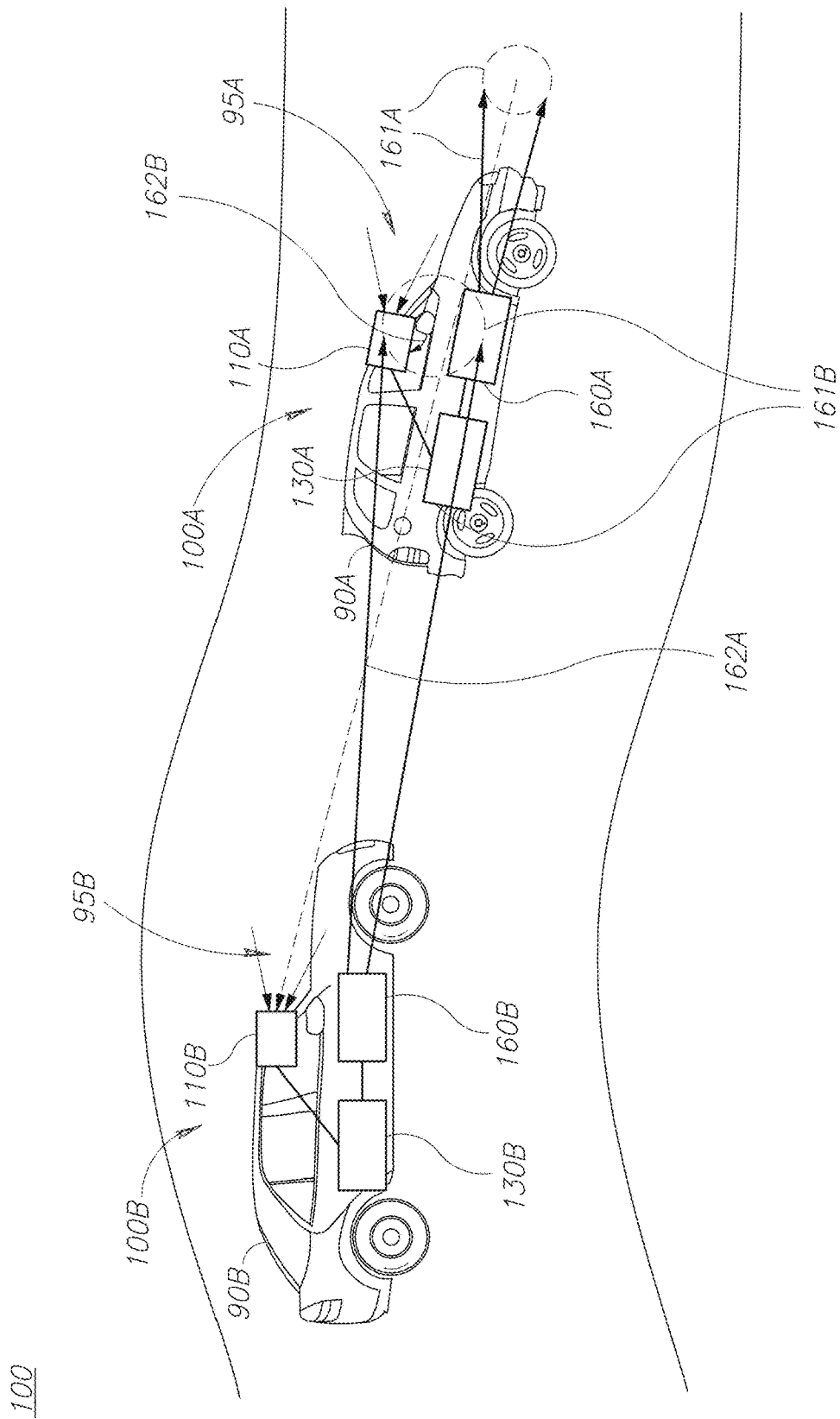
FIG. 4B is a high level schematic block diagram of a system with communication between vehicle-installed systems during an overtaking, according to some embodiments of the invention.

FIG. 4B is a high level schematic block diagram of system 100 with communication between vehicle-installed systems 100A, 100B during an overtaking, according to some embodiments of the invention. For example, modulated infrared radiation may be used as a non-disturbing communication channel to enhance the safety of the overtaking. System 100B in rear vehicle 90B may deliver information (162B) to system 100A in front vehicle 90A via modulated illumination 161B e.g., via a rear-view mirror or a wing (side) mirror to sensing unit 110A, via sensors of a cellular device or glasses, via a backwards looking sensor, via illumination spot 161B etc. In certain embodiments, rear system 100B may deliver instructions or warnings to front system 100A to enhance the safety of the overtaking. In certain embodiments, system 100A in front vehicle 90A may deliver information to system 100B in rear vehicle 90B via modulated illumination 161A e.g., illuminated onto a region visible by sensing unit 110B, via sensors of a cellular device or glasses, via a forwards looking sensor, via illumination spot 161A etc. In certain embodiments, front system 100A may deliver instructions or warnings to rear system 100B to enhance the safety of the overtaking, e.g., indicate obstacles on the road ahead, enhance images by sensing unit 110B with image parts of regions occluded by vehicle 90A etc.

In certain embodiments, system 100 may be configured to adjusting the illumination intensity to the vehicle's surrounding and imaging requirements. For example, lower intensity may be applied at urban settings (for safety reason and/or as required detection ranges may be shorter)

System 100 may be configured to implement image processing at various weather conditions (e.g., day, night, harsh weather) to identify traffic signs, correlate the signs with respective maps, provide sign translation, suggest driving behavior parameters and implement automatic speed control respectively. System 100 may be configured to correlate identified objects with traffic signs, e.g., identify presence of road workers.

System 100 may dynamically update the displayed enhanced images. Display 120 may comprise a user interface (not shown) configured to enable a user modify the system's operation parameters according to the driving conditions, traffic conditions etc. For example, different operation parameters may be applied to urban regions versus highways with respect to image resolution and update rate, expect objects and signs, type of required alerts, types of required image enhancements etc. Proportion of color image data, infrared image data and gated image data may be adapted as additional operation parameters. The user interface may apply decision criteria with respect to data representation, e.g., indicate a level of danger in varying situations, apply synthetic colors to image regions to indicate certain features and so forth. Display 120 (and the user interface) may be implemented as any form of interface, such as a two dimensional display, a windscreen display, a transparent display, a HUD (heads up display), mobile device displays (e.g., glasses, smartphone), a wearable display such as a head mounted display or glasses and so on. System 100 may use eye or head tracking technologies for implementing display 120 (e.g., for identifying the driver's region of interest). System 100 may further provide audible signals in addition to visual signals. System 100 may further provide tactile signals in addition to visual signals.

In certain embodiments, display 120 may provide windscreen image enhancement such as object detection by optical indications on the windscreen. For example, illumination sources such as LEDs or optical fibers may be embedded in the windshield or at its periphery, and be configured to indicate, with respect to the driver's line of sight, potential dangers, general indications and information etc.

In certain embodiments, system 100 may be configured to track objects, characterize their imaging and movement parameters and use the characterization to improve future identification and image enhancements.

In certain embodiments, system 100 may be configured to adjust the driver's depth of field according to driving conditions and identified events and suggest respective driving behavior. System 100 may be configured to record driver behavior and analyze behavioral patterns according to image features.

In certain embodiments, system 100 may be configured to adjust the field of view (FOV) of the sensing unit(s), e.g., using an optical zoom and/or a digital zoom, according to driving conditions such as vehicle speed, location (e.g., urban, highway etc.), weather and time. For example, in a fast moving vehicle, system 100 may adjust the sensing unit(s) to have a narrow FOV, while, in a slow moving vehicle, system 100 may adjust the sensing unit(s) to have a wide FOV.

In certain embodiments, system 100 may be configured to adjust the lighting illumination pattern in the field of illumination (FOI) according to driving conditions such as vehicle speed, location (e.g., urban, highway etc.), weather and time. For example, in a fast moving vehicle, system 100 may adjust the illuminator to have a narrow FOI, while, in a slow moving vehicle, system 100 may adjust the illuminator to have a wide FOI.

In certain embodiments, system 100 may be configured to adjust the displayed image with synthetic information. A NIR image may lack visible information such as originated from visible spectrum LEDs sources (e.g., traffic lights, lite traffic signs, rear vehicle tail lights, rear vehicle braking lights, front vehicle headlamps etc.). System 100 may detect and classify objects using retro-reflectors (i.e., traffic signs, rear vehicle retro-reflectors) and may implement synthetic information on the NIR image such as adding red, green, blue or any other color information on the correct image location. System 100 may detect and classify objects using shape detection (e.g., traffic signs, vehicle types, etc.) and may implement synthetic information on the NIR image such as adding red, green, blue or any other color information on the correct image location. The synthetic information display in system 100 may be controlled according to driving conditions such as vehicle speed, location (e.g., urban, highway etc.), weather and time.

In certain embodiments, system 100 may be configured to adjust a displayed 3D image with synthetic information, for example: indications of close objects (e.g., at 0-50 m) may be provided in red color, indications of mid-range objects (e.g., at 50-100 m) may be provided in orange color and indications of long-range objects (e.g., at 100-200 m) may be provided in green. The 3D information may be provided from sensing unit(s) 110, map information and other vehicle-systems.

In certain embodiments, system 100 may be configured to adjust the sensing unit(s)'s 110 anti-blooming ratio within the pixel array by dynamically controlling the pixel anti-blooming voltage transistor according to driving conditions and ambient light conditions. In certain embodiments, system 100 may be configured to enhance captured image by fusing image data from different sources according to image characteristics. For example, processing unit 130 may be configured to identify dark visual image regions and enhance them with infrared image data. In certain embodiments, driving tunnels at daytime, system 100 may fuse active gated imaging for dark regions inside the tunnel with passive imaging for illuminated regions outside the tunnel. Active sensing may be applied to any image region which is not sufficiently illuminated.

In certain embodiments, active sensing may be used to remove or attenuate shadows in the images, e.g., due to solar illumination in the daytime or due to artificial illumination in the nighttime, due to the use of illuminator 160 and/or due to the used of gated imaging which enables capturing a certain depth range, possibly one without the shadows. Shadow removal or attenuation may enable more efficient algorithmic processing to provide more reliable warnings (e.g., forward collision warning FCW, lane departure warning LDW, etc.).

In certain embodiments, active sensing may be used to detect optical elements in the sensed scene, such as optical systems in other vehicles and at the side of the road, due to their reflectivity characteristics (e.g., optics functioning as retro-reflector of the radiation from illuminator 160).

In certain embodiments, system 100 may be configured to adjust the blur spot originating from the optical channel in the sensing unit(s)'s 110 to reduce cross-talk within the pixel array by dynamically controlling the optical channel operating point.

Any of the image enhancements may be carried out using augmented reality technologies, such as half transparent enhancements to avoid blocking the front scene, single image enhancements, adaptations of the captured image and presenting indications of information and expected events (e.g., over the corner or curve, pedestrians etc.). Certain embodiments comprise enhancing the captured images by converting infrared images or hyperspectral images to regular visual range daytime images, possibly based on stored images from past drives, accommodating according to line of sight adaptations and telemetric data.

System 100 may use mobile communication devices in the vehicle (belonging to the driver or to passengers) to indicate various events, possibly as part of GUI 120, sensing unit 110 (when appropriately positioned) or processing unit 130.

Figure 5:
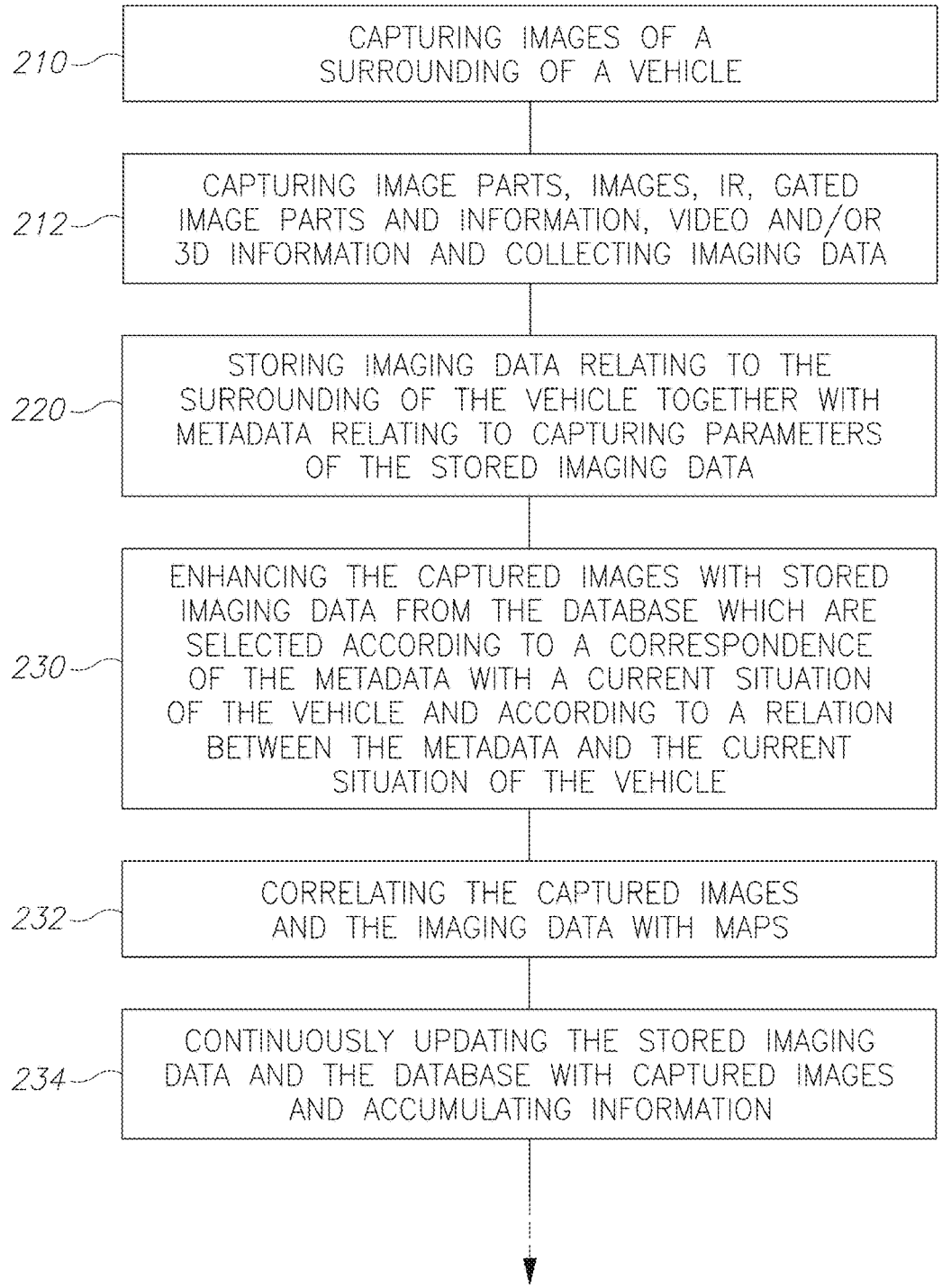
FIG. 5 is a high level flowchart illustrating a method, according to some embodiments of the invention.

FIG. 5 is a high level flowchart illustrating a method 200, according to some embodiments of the invention. Method 200 may be at least partly carried out using at least one computer processor.

In certain embodiments, method 200 may comprise capturing images of a surrounding of a vehicle (stage 210), e.g., capturing image parts, images, IR, gated image parts and information, video and/or 3D information and collecting imaging data (stage 212); storing imaging data relating to the surrounding of the vehicle together with metadata relating to capturing parameters of the stored imaging data (stage 220) and enhancing the captured images with stored imaging data (e.g., from the database) which are selected according to a correspondence of the metadata with a current situation of the vehicle and according to a relation between the metadata and the current situation of the vehicle (stage 230). Certain embodiments comprise correlating the captured images and the imaging data with maps (stage 232) and/or continuously updating the stored imaging data and the database with captured images and accumulating information (stage 234). Method 200 may comprise enhancing the images with respect to an illumination level in the captured surroundings (vehicle environment or by system illumination) (stage 240), e.g., by replacing saturated areas in the image with imaging data or image parts from another source (stage 242) and/or by providing low light image parts with gated imaging data (stage 245). Method 200 may further comprise displaying the enhanced captured images (stage 250).

In certain embodiments, method 200 may comprise connecting multiple sensing units via a communication link (stage 260) and enhancing captured images with captured image data from one or more another sensing unit according to a relation between capturing parameters of the units (stage 265). For example, method 200 may comprise enhancing the images with image parts of occluded regions (stage 270), e.g., by providing the image parts of occluded regions from occluding vehicles (stage 275) or by enhancing the images with image parts of respective past images (stage 280) such as images retrieved from the database or from sensing unit(s) of the same or different vehicles (stage 285).

Method 200 may further comprise identifying regions with specified reflection characteristics (stage 287) and enhancing the image with synthetic colors that correspond to reflection characteristics (stage 288).

In certain embodiments, method 200 may comprise configuring a gated infrared sensing unit to enhance the captured images to indicate specified reflectivity parameters of regions in the captured images (stage 290), for example, indicating (with respect to the regions) image characteristics associated with specified road obstacles (stage 295) and/or indicating ice or oil (e.g., on the road in front of the vehicle) identified by their infrared reflection characteristics (stage 297).

Method 200 may further comprise configuring specified regions of the detection array to have dynamic ranges that enable retrieving expected information in corresponding regions of the images (stage 292) and enhancing the images by combining sensor regions operating at different dynamic ranges (stage 294).

In certain embodiments, method 200 may comprise applying patterned filter(s) to an array of pixels (of the sensing unit) to determine sensing wavelength ranges of at least some of the pixels (stage 300). Method 200 may further comprise increasing a number of infrared pixels upon detection of low visual range visibility (stage 310), modifying the patterned filter according to capturing conditions (stage 312), e.g., adjusting the blur spot originating from the optical channel in the sensing unit(s) to reduce cross-talk within the pixel array by dynamically controlling the optical channel operating point (stage 313) and/or modifying the patterned filter according to enhancement requirements (stage 314). In certain embodiments, method 200 may further comprise applying gated imaging with at least some of the pixels (stage 316).

In certain embodiments, method 200 may comprise using gateable infrared sensors with respective infrared illuminators, each associated with a vehicle (stage 320), decoding a spot illuminated by an illuminator of a different vehicle (stage 330), encoding an illuminated spot according to the decoded spot (stage 335) and thus communicating between vehicles via data encoded in and decoded from the illuminator spots (stage 340). Method 200 may further comprise communicating via the illuminator spots forwards and/or backwards with respect to the vehicle advancement direction (stage 342), e.g., communicating during an overtaking, unidirectionally or bidirectionally, to coordinate the overtaking, enhance its safety and exchange information (stage 344).

Method 200 may further comprise adjusting illumination intensity to the vehicle's surrounding and imaging requirements (stage 337). Certain embodiments comprise improving autonomous vehicle capabilities by providing more information on the surrounding by the enhancements (stage 350).

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
   a sensing unit configured to capture images of a surrounding of a vehicle, using specified capturing parameters, wherein the sensing unit comprises a gated sensor with gated-imaging capability, and
   a processing unit connected to a database,
   wherein:
      the database is configured to store imaging data relating to a part of the surrounding of the vehicle together with metadata relating to the capturing parameters of the stored imaging data, and
      the processing unit is configured to enhance the captured images with stored imaging data from the database which are selected according to a correspondence of the metadata with a current situation of the vehicle and according to a relation between the metadata and the current situation of the vehicle,
   wherein the enhancement is with stored imaging data relating to the part of the surrounding, the stored imaging data being selected to have different metadata with respect to at least one of the capturing parameters, and to complement the captured images with respect to a line of sight of a driver of the vehicle to the part of the surrounding, and
   wherein the enhancement further comprises range data relating to the part of the surrounding derived by the gated imaging capability.

2. The system of claim 1, further comprising a display configured to display the captured images and wherein the processing unit is further configured to display the enhanced images on the display.

3. The system of claim 1, wherein the enhancement is carried out with respect to an illumination level in a captured environment, with image parts below the illumination level provided by the gated sensor and image parts above the illumination level provided by a non-gated sensor.

4. The system of claim 1, wherein the enhancement is carried out using a database image provided to the processing unit over a communication network, the database image selected to represent occluded regions in the captured image.

5. The system of claim 1, wherein the enhancement is carried out using a past image taken by the system during a former drive in a same location.

6. A method comprising:
   capturing images of a surrounding of a vehicle, using specified capturing parameters and with gated-imaging capability, and
   enhancing the captured images with retrieved stored imaging data, the stored imaging data relating to a part of the surrounding of the vehicle and stored together with metadata relating to the capturing parameters of the stored imaging data,
   wherein the stored imaging data are selected according to a correspondence of the metadata with a current situation of the vehicle and according to a relation between the metadata and the current situation of the vehicle,
   wherein the stored imaging data is selected to have different metadata with respect to at least one of the capturing parameters, and to complement the captured images with respect to a line of sight of a driver of the vehicle to the part of the surrounding, and
   wherein the enhancing further comprises enhancing the captured images with range data relating to the part of the surrounding derived by the gated imaging capability.

7. The method of claim 6, further comprising enhancing the images with respect to an illumination level in the captured surroundings.

8. The method of claim 7, further comprising providing low light image parts with gated imaging data.

9. The method of claim 6, further comprising identifying regions with specified reflection characteristics and enhancing the images with synthetic colors that correspond to the reflection characteristics.

10. The method of claim 6, further comprising configuring specified regions of a detection array capturing the images to have dynamic ranges that enable retrieving expected information in corresponding regions of the images, and enhancing the images by combining the sensor regions operating at different dynamic ranges.

11. The method of claim 6, further comprising displaying the enhanced captured images.

12. A system comprising:
   at least a first and a second sensing units configured to capture images of surroundings of respective at least a first and a second vehicles, the at least two sensing units connected, wherein at least one of the sensing units comprises a gated sensor with gated-imaging capability, a processing unit configured to enhance captured images of the first sensing unit with captured image data from the second sensing unit according to a relation between capturing parameters of the sensing units, wherein the enhancement is with respect to a part of the surrounding, selected to complement the captured images with respect to a line of sight of a driver of the respective vehicle to the part of the surrounding, wherein the at least first and second sensing units differ in at least one of: time of capturing the images, place of capturing the images and type of respective vehicle, and wherein the enhancement further comprises range data relating to the part of the surrounding derived by the gated imaging capability.

13. The system of claim 12, wherein the enhancement is carried out using a second image captured by an occluding vehicle with respect to a region occluded thereby, and wherein the second image is provided to the processing unit over a communication network.

14. The system of claim 12, wherein the enhancement is carried out using a past image taken by a corresponding system in a different vehicle during a drive in a same location.

15. The system of claim 12, wherein the sensing units are further configured to display the enhanced captured images.

16. A method comprising:

connecting a plurality of sensing units via a communication link, each sensing unit configured to capture images of surroundings of respective vehicles and store related image data, wherein at least one of the sensing units comprises a gated sensor with gated-imaging capability, and enhancing captured images with captured image data from another sensing unit according to a relation between capturing parameters of the units, wherein the enhancement is with respect to a part of the surrounding, selected to complement the captured images with respect to a line of sight of a driver of the respective vehicle to the part of the surrounding, wherein the sensing units differ in at least one of: time of capturing the images, place of capturing the images and type of the respective vehicle, and wherein the enhancement further comprises range data relating to the part of the surrounding derived by the gated imaging capability.

17. The method of claim 16, further comprising enhancing the captured images with image parts of occluded regions received from respective occluding vehicles.

18. The method of claim 16, further comprising enhancing the captured images with image parts received from a sensing unit at another vehicle.

* * * * *